Aug. 16, 1966  R. L. WOLF  3,267,452
BATTERY CHARGER CLAMP AND POLARITY DETECTOR
Filed Dec. 23, 1963  2 Sheets-Sheet 1

INVENTOR
ROBERT L. WOLF
BY Cohn and Powell
ATTORNEYS

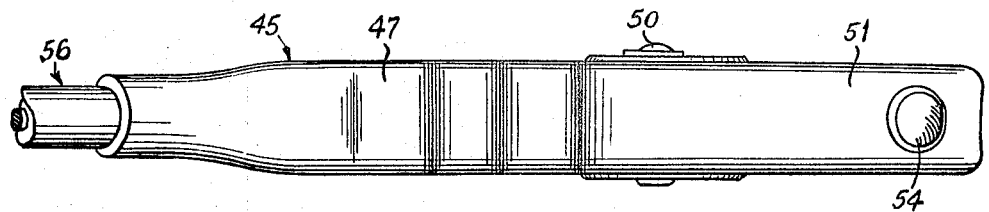
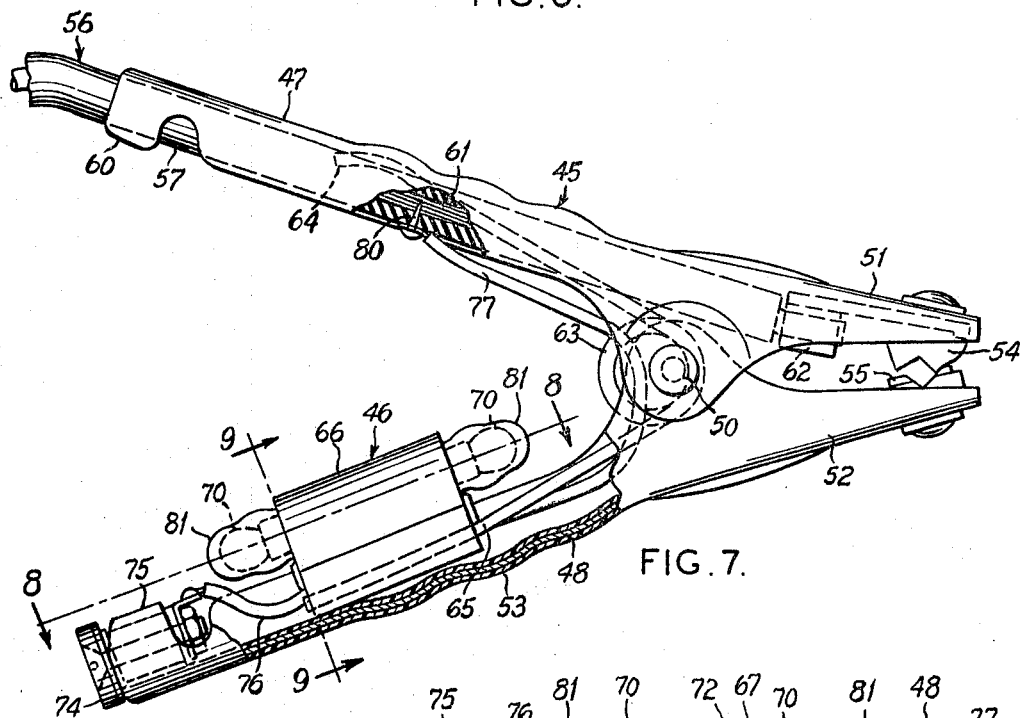
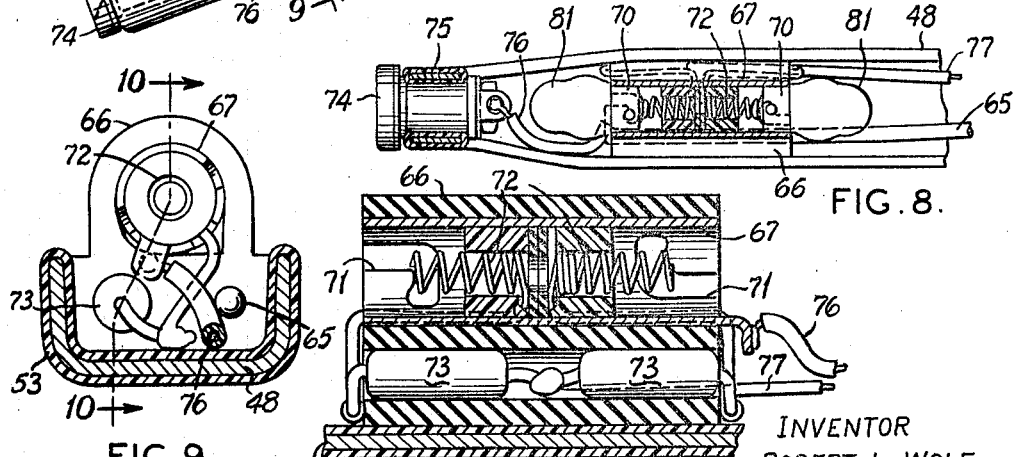

United States Patent Office 3,267,452
Patented August 16, 1966

3,267,452
BATTERY CHARGER CLAMP AND
POLARITY DETECTOR
Robert L. Wolf, Granite City, Ill., assignor to Associated Equipment Corporation, St. Louis, Mo., a corporation of Missouri
Filed Dec. 23, 1963, Ser. No. 332,490
20 Claims. (Cl. 340—249)

This invention relates generally to improvements in a battery charger clamp, and more particularly to improvements in a clamp having a polarity detector for determining whether or not the clamp is being connected to the correct terminal of a battery prior to charging.

In utilizing a charger to revitalize or charge a battery, extreme care must be taken to assure that the clamps carrying the positive and negative cables of the charger are connected to corresponding and correct posts of such battery in order to avoid the undesirable effects of reverse charging. For example, reverse charging of automobile storage batteries, usually of the six or twelve volt type, can cause severe damage to alternator systems, transistor radios, voltage regulators, ignition systems as well as the batteries per se.

It is an important objective of the present invention to provide a polarity detector for assuring that the clamps of the battery charger are being attached to the correct battery posts before charging current is passed through the battery, thereby avoiding any reverse charging action and the resulting disadvantages mentioned previously.

An important object is achieved by mounting a sensing unit on one of the charger clamps and connecting such unit to the associated clamp cable, the sensing unit being capable of indicating whether or not such clamp is being attached to the proper battery terminal.

Other important advantages are realized in that the present clamps can be attached to the battery terminals and the battery charged without the bothersome time-consuming task of disconnecting battery cables.

An important object is achieved by constructing the clamp of a pair of hingedly connected handles having jaws at one end that are urged together by a spring, by attaching a cable to one of the handles and electrically connecting such cable to the termianl contact of its jaw, and by placing a polarity detector on the other handle.

Another important object is afforded by locating the test contact of the polarity detector at the end of the handle that carries the detector, the test contact being conveniently placed for touching a battery terminal to determine the correct circuitry of the battery charging system before making the last connection and before actual charging.

Still another important object is realized by having insulation about the end of the handle carrying the test contact so that in the event of incorrect connection, no metal of the handle will accidentally engage the battery terminal during the testing operation so as to cause a high current flow.

An important object is obtained by having means associated with the indicating bulb of the polarity detector which precludes the bulb from emitting a light to indicate an incorrect connection when the voltage between the battery terminal and the test contact is less than a predetermined value.

Another important objective is provided in that the above mentioned means consists of a translucent material about the bulb which masks any light emitted from the bulb caused by a voltage between the battery terminal and test contact which is less than a predetermined value. In one embodiment, such means is a translucent sleeve over the handle and enclosing the bulb, while in another embodiment, such means is a translucent cap fitted directly over the bulb.

Other important advantages are realized by locating the detector in an insulation sleeve slipped over one clamp handle with only the test contact projecting through the sleeve end for engagement with the battery terminal, the sleeve fully protecting and insulating the handle and the other parts of the detector.

An important object is afforded by the structure of the detector and its relationship to the handle end so as to provide and maintain an electrical connection and to preclude any relative critical dimensions. For example, a spring is disposed about the bulb and bulb holder and serves to electrically connect the holder to the metallic handle when the sleeve is slipped over the handle, the spring being compressed to maintain the electrical connection and to enable a relative movement within a limited range.

Another important objective is to provide a battery charging clamp with a polarity detector that is simple and durable in construction, economical to manufacture and assemble, highly efficient in operation, and which can be readily utilized by anyone with little or no instruction.

The foregoing and numerous other objects and advantages of the invention will more clearly appear from the following description of a preferred embodiment, and a modification thereof, particularly when considered in connection with the accompanying drawings, in which:

FIG. 6 is a top plan view of a modified battery charger clamp;

FIG. 7 is a side elevational view, partially cut away and illustrated in cross section, of the modified clamp;

FIG. 8 is a cross sectional view as seen along line 8—8 of FIG. 7;

FIG. 9 is an enlarged cross sectional view as seen along line 9—9 of FIG. 7, and FIG. 10 is a cross sectional view as seen along staggered line 10—10 of FIG. 9.

Figure 1:
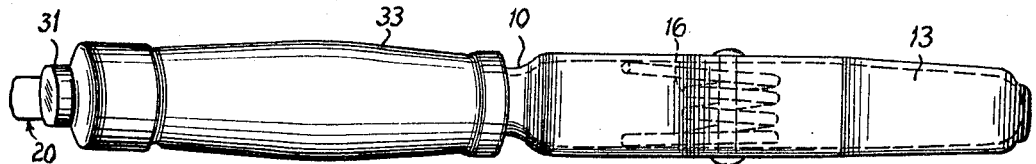
FIG. 1 is a top elevational view of a battery charger clamp.
Figures 2, 3:
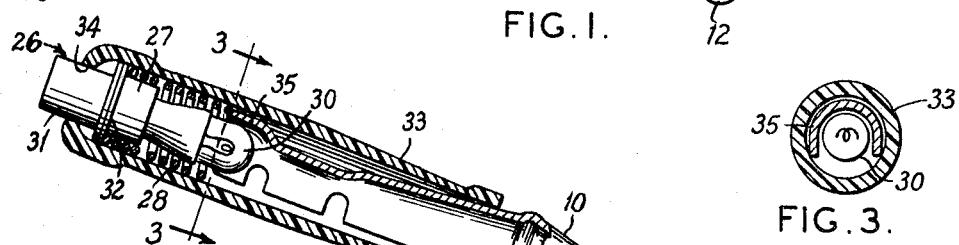
FIG. 2 is a side elevational view, with one handle shown in cross section.
FIG. 3 is a cross sectional view as seen along line 3—3 of FIG. 2.
Figure 4:
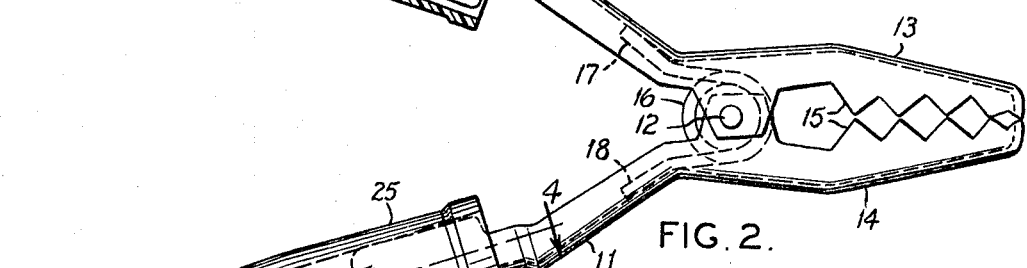
FIG. 4 is a fragmentary, cross sectional view as seen along line 4—4 of FIG. 2.

Referring now by characters of reference to the embodiment disclosed in FIGS. 1–4 inclusive, it is seen that the battery charger clamp includes a pair of metallic handles 10 and 11 hingedly connected by a transverse pin 12 to provide a pair of opposed jaws 13 and 14 at one end. The jaws 13 and 14 include teeth 15 constituting terminal contacts. A wound torsion spring 16 is disposed about the transverse hinge pin 12 and between the handles 10 and 11, the opposite spring arms 17 and engaging the handles 10 and 11. The spring 16 tends to urge the jaws 13 and 14 together under pressure, and therefore tends to urge the jaws teeth 15 into biting engagement with a battery terminal when located between the jaws 13 and 14.

A cable 20 is located within the U-shaped configuration of handle 11. The outer end of the handle 11 includes tabs 21 that are compressed about the cable sheath 22 to hold the cable in place. The wire 23 of such cable 20 is electrically connected to the handle 11 by compressing a handle portion 24 rearwardly of the end tabs 21 securely on the wire 23. Fitted over the handle 11 to cover the handle end and its connection to the cable 20 and to provide a hand grip, is a sleeve 25 constructed of an insulating material.

A polarity detector generally indicated at 26 is carried by the other handle 10. This polarity detector 26 includes a bulb holder 27 adapted to receive a light bulb 30, and a test contact 31 electrically connected to the holder 27. The holder 27 includes a peripheral flange 32 adapted to seat one end of a compression spring 28 located about the holder 27 and bulb 30.

Another tubular sleeve 33 of an insulating material and constituting a hand grip is provided to hold the polarity detector 26. Specifically, the polarity detector 26 is dropped down into the bottom of the sleeve 33 so that the test contact 31 projects through the opening 34 formed in the sleeve end. Then, the sleeve 33 is fitted over the handle 10, the handle end 35 engaging the opposite spring end and compressing the spring 28. The spring 28 electrically connects the holder 27 with the metallic handle 10. The handle end 35 is substantially U-shaped and receives the bulb 30 upon compression of spring 28.

For reasons which will later appear, the sleeve 33 is constructed of a translucent material and is preferably red in color so that when the bulb 30 is lighted to a predetermined intensity, such light will be emitted through the translucent material in a red glow to indicate an unsafe condition.

Figure 5:
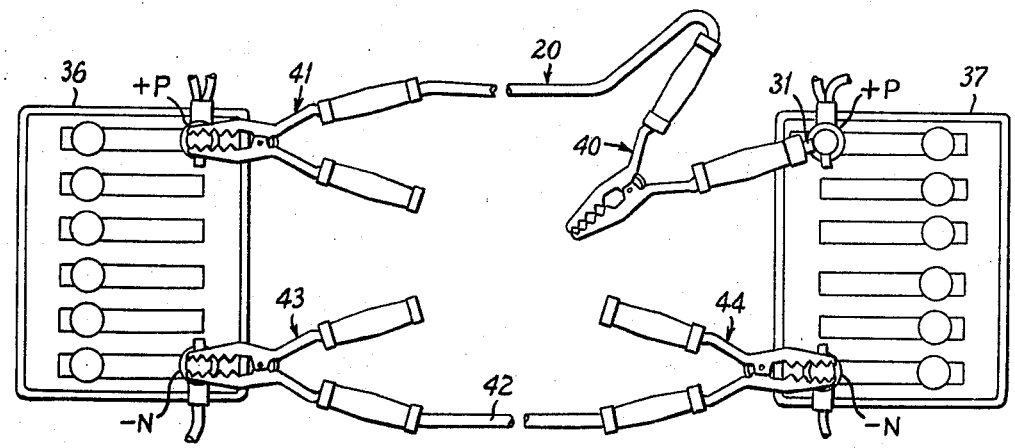
FIG. 5 is a top plan view of a battery charging system.

The use of the battery clamp illustrated in FIGS. 1-4 is best shown in FIG. 5. In this system, the starting car battery 36 which is usually of the twelve volt type has the usual positive battery terminal P and negative battery terminal N. The stalled car battery 37 may be either of the twelve volt or six volt type and also includes the usual positive battery terminal P and negative battery terminal N. The test clamp 40 and its cooperating clamp 41 interconnected by cable 20 are provided with red grip sleeves and will be subsequently referred to as the red clamps. The other booster cable 42 is provided with a pair of cooperating clamps 43 and 44, each of which is provided with black grip sleeves and will be referred to as the black clamps during this description.

In use, the one red clamp 41 and one black clamp 43 are connected to the battery terminals P and N of the starting car battery 36. The polarity detector 26 is first tested by touching the test contact 31 against the metal of the free black clamp 44. The bulb 30 should light up and there should be a warning glow through the red grip sleeve 33 of the test clamp 40. If there is no warning signal, the polarity detector 26 is not functioning and should be repaired as by replacement of the bulb 30. If the warning signal has been obtained during this test, it signifies that the polarity detector is functioning properly. Then, the other black clamp 44 is connected to the battery terminal end of the stalled car battery 37.

Before connecting the test clamp 40 to the other remaining battery terminal of the stalled car battery 37 the test contact 31 is touched against the remaining battery terminal of battery 37 as is illustrated in FIG. 5. If a warning glow is obtained through the red sleeve 33 the cable hookup is wrong and indicates that the test clamp 40 and black clamp 44 should be reversed on the battery terminals of battery 37. However, if no warning signal is obtained, the cable hookup is correct and the test clamp 40 can be attached to the remaining battery terminal P.

The service vehicle has usually a twelve volt system, i.e., twelve volts with the motor off, fourteen volts with the motor on. The stalled car has usually a twelve volt system but it can be a six volt system. It is absolutely necessary to make the connections between the batteries 36 and 37 correct in order to avoid damage to the alternator of the stalled car. The alternator contains diodes that fail very quickly at currents way above rated values, such currents being possible if the last connection between the batteries is made incorrectly.

Assuming first that the service vehicle has a fourteen volt system and that the stalled car has a twelve volt system, it will be readily understood that with a correct connection between the batteries 36 and 37, the voltage between the last test clamp 40 and the battery terminal P is two volts. Obviously, this voltage will not energize the bulb 30 and there will be no warning glow through the red sleeve 33. Thus, a safe or correct connection is indicated. However, if there is an incorrect connection, the voltage between the last clamp 40 and the remaining battery terminal N is twenty-six volts. This voltage energizes the bulb 30 and causes a light intensity sufficient to emit through the red translucent material comprising sleeve 33 and cause a red warning glow. If the service vehicle battery is twelve volts instead of fourteen volts, the voltage differential between the last test clamp 40 and the remaining battery terminal will be twenty-four volts when the cable hookup is not correct. It is seen that under this system there will be no stop signal at two volts and less while there should be a stop signal at twenty-four volts and greater.

Assuming next that the service vehicle has a fourteen volt system and that the stalled car has a six volt system, it will be understood that with a correct connection the voltage between the last test clamp 40 and the remaining battery terminal is eight volts and with an incorrect connection the voltage will be twenty volts. If the service vehicle has a twelve volt system, the voltage differential during correct and incorrect connections will be six volts and eighteen volts respectively. Under this system there will be no stop signal at eight volts and less while there will be a stop signal at eighteen volts and greater. With eight volts, the bulb 30 will be dimly lit, but such light will not be visible to provide any warning glow because the translucent material comprising the sleeve 33 masks out the light. On the other hand, the translucent material of sleeve 33 will permit an emission of light in the form of a red glow when the bulb 30 is energized at eighteen volts and greater.

If it is desired to replace the polarity indicator 26 or to replace the bulb 30, the sleeve 33 is simply slipped off of the end of handle 10 so that the detector 26 can fall out of such sleeve 33. The old detector 26 can be repaired as by replacing the bulb 30 and the repaired detector or a new detector can be replaced by inserting it into the sleeve 33 so that the test contact 31 projects through the end sleeve opening 34. Then, the sleeve 33 is simply slipped on the handle 10. Automatically, the spring 28 will be compressed and the polarity detector 26 placed into electrical connection with the cable 20 through the metallic handles 10 and 11.

FIGS. 6-10 are directed to a modified test clamp 45 and a modified polarity detector 46. For example, this test clamp 45 includes a pair of handles 47 and 48 hingedly connected by a transverse pivot pin 50 to provide a pair of opposed jaws 51 and 52 at one end. The metal of these handles 47 and 48 and these jaws 51 and 52 is covered with an insulating material 53.

A pair of terminal contacts 54 and 55 are secured to the jaws 51 and 52 respectively. It will be importantly noted that these terminal contacts 54 and 55 are insulated from each other and from the metal forming the handles by the covering insulation 53.

The booster cable 56 extends along and within the U-shape of clamp handle 47. The sheath 57 of cable 56 is secured to handle 47 by outer tabs 60 that are bent over and compressed about the sheath 57. The outer end of wire 61 is fastened and electrically connected to the terminal contact 54 by fitting 62.

A torsion spring 63 is wound and located about the hinge pin 50, one spring arm 64 bearing against handle 47 and the other spring arm 65 bearing against handle 48. The spring 63 tends to urge the jaws 51 and 52 and hence the terminal contacts 54 and 55 toward each other.

The polarity detector 46 includes a body 66 constructed of a resilient material such as rubber. The spring arm 65 extends through the rubber body 66 and tends to hold the body and hence the polarity detector within and to the clamp handle 48.

Located within and extending through the rubber body 66 is a tubular holder 67 adapted to receive a bulb 70 at each end. The holder 67 is provided with a bayonet slot 71 at each end to fasten the bulbs 70. A pair of springs 72 are located within the bulb holder 67 and tend to urge such bulbs 70 outwardly of such holder, the springs 72 being electrically connected to the bulbs 70.

As will appear upon later description, the bulbs 70 are connected in parallel so as to be subjected to the same voltage. Normally, both bulbs 70 will be energized, but if one is burnt out the other bulb 70 will still be energized in order to provide an operative polarity detector. The electrical circuit interconnecting each bulb 70 includes a rectifier 73, the rectifiers 73 being located within the rubber body 66.

A test contact 74 is attached to the end of handle 48, the end tabs 75 being wrapped around the test contact 74 to hold it in place. It will be importantly noted that test contact 74 extends out the end of handle 48 and is completely insulated from the metallic body of such handle 48 by the covering insulation 53. A lead wire 76 electrically interconnects the test contact 74 with the bulb holder 67 while a tap wire 77 electrically interconnects the holder 67 with the cable wire 61. The tap wire 77 includes a needle 80 pressed into and through the cable sheath 57 and into the strands of wire 61 to provide an effective electrical connection.

For reasons which will later appear, the bulbs 70 are covered by plastic red caps 81 made of a translucent material and of a density to preclude emission of light upon energization of the bulbs 70 under some operating conditions, yet allow such emission through the caps 81 under other operating conditions.

It is thought that the usage of the modified test clamp 45 has become fully apparent from the foregoing description of parts and from the description of the similar system disclosed in FIG. 5. However, for completeness of disclosure the function of this polarity detector 46 will be described briefly.

For example, a black clamp of one booster cable and a red clamp of the other booster cable are connected to the battery terminals of the starting vehicle battery. The other black clamp is attached to one of the battery terminals of the stalled car battery. Then, the test contact 74 of the red test clamp 45 is touched to the remaining battery terminal on the stalled car battery. If a red warning light is noted by operative energization of either bulb 70, there is an indication that the cable hookup is wrong and that the clamps on the stalled car battery have to be reversed. If no warning light is indicated by either of the bulbs 70 this is an indication that the cable hookup is correct. Then, the red test clamp 45 can be connected to the remaining battery terminal.

If only one of the bulbs 70 provides a red glow, this is a warning that the other bulb is either loose or broken. The polarity detector 46 can be utilized with only one bulb 70 but it is advantageous to replace the bad bulb promptly in order to have a safety factor. If both bulbs 70 should become inoperative, there will be no warning device available to indicate an incorrect cable connection. Either bulb 70 can be conveniently replaced.

The polarity detector 46 has the same sensing requirements as the polarity detector 26. If the stalled car has a twelve volt system, there should be no stop signal at two volts and less while there should be a stop signal at 24 volts and greater. If the stalled car has a six volt system, there should be no stop signal at eight volts and less while there should be a stop signal at eighteen volts and greater. The red translucent caps 81 effectively mask the bulbs 70 so that if such bulbs 70 are dimly lit under energization of eight volts or less there is no visible emission of such light through the caps 81, and therefore, there will be no red warning glow. On the other hand, when the bulbs 70 are energized by a voltage of eighteen volts and greater, the red translucent material of the caps 81 is of a density to allow emission of such light therethrough and thereby provide a red warning glow.

Although the invention has been described by making detailed reference to a preferred embodiment, and a modification thereof, such detail is to be understood in an instructive, rather than in any restrictive sense, many variants being possible within the scope of its claims hereunto appended.

I claim as my invention:

1. In a battery charger clamp:
    (a) a pair of handles hingedly connected to provide jaws at one end,
    (b) spring means tending to urge the jaws together, the jaws including terminal contacts,
    (c) a cable attached to one of the handles and electrically connected to the terminal contact of its jaw,
    (d) a polarity detector carried by one of the handles, the detector including a test contact at the end of one handle adapted to engage a battery terminal, and
    (e) an indicating means electrically interconnected to the test contact and to the cable.

2. A battery charger clamp as defined above in claim 1, in which:
    (f) the indicating means consists of a bulb, and
    (g) an electrical circuit interconnects the test contact and bulb with the cable.

3. A battery charger clamp as defined above in claim 1, in which:
    (f) insulation is provided about the end of the handle carrying the test contact so that in the event of incorrect connection no metal of the handle will accidentally engage the battery terminal to cause a high current flow.

4. In a battery charger clamp:
    (a) a pair of handles hingedly connected to provide jaws at one end,
    (b) spring means tending to urge the jaws together, the jaws including terminal contacts,
    (c) a cable attached to one of the handles and electrically connected to the terminal contact of its jaw,
    (d) a polarity detector carried by the other handle, the detector including a bulb,
    (e) a test contact adapted to engage a battery terminal, and
    (f) an electrical circuit interconnecting the test contact and bulb with the cable.

5. A battery charger clamp as defined above in claim 4, in which:
    (g) means is associated with the bulb precluding light to indicate an incorrect connection when the voltage between the battery terminal and the test contact is less than a predetermined value.

6. A battery charger clamp as defined above in claim 4, in which:
    (g) a translucent material is disposed about the bulb which masks any light from the bulb caused by a voltage between the battery terminal and test contact that is less than a predetermined value.

7. A battery charger clamp as defined above in claim 4, in which:
    (g) a translucent sleeve is located over the one handle and encloses the bulb, the translucent sleeve masking any light from the bulb caused by a voltage between a battery terminal and test contact that is less than a predetermined value.

8. A battery charger clamp as defined above in claim 4, in which:
    (g) a translucent cap is located over the bulb which masks any light from the bulb caused by a voltage between the battery terminal and test contact that is less than a predetermined value.

9. In a battery charger clamp:
(a) a pair of handles hingedly connected to provide jaws at one end,
(b) spring means tending to urge the jaws together, the jaws including terminal contacts,
(c) a cable attached to one of the handles and electrically connected to the terminal contact of its jaw,
(d) an insulation sleeve about one handle,
(e) a polarity detector carried by the one handle and located within the sleeve, the polarity detector including a bulb,
(f) a test contact extending through the outer end of the sleeve and adapted to engage a battery terminal, and
(g) means interconnecting the bulb and test contact with the cable.

10. A battery charger clamp as defined above in claim 9, in which:
(h) the sleeve consists of a translucent material about the bulb which masks any light from the bulb caused by a voltage between the battery terminal and the test contact which is less than a predetermined value.

11. In a battery charger clamp:
(a) a pair of metallic handles hingedly connected to provide jaws at one end, the jaws constituting terminal contacts,
contacts,
(b) spring means tending to urge the jaws together,
(c) a cable attached to and electrically connected to one of the handles,
(d) an insulating sleeve about the other handle,
(e) a polarity detector disposed in the sleeve, the detector including a bulb,
(f) a bulb holder, and
(g) a test contact electrically connected to the holder and extending through the end of the sleeve, the test contact being adapted to engage a battery terminal, and
(h) a spring disposed about the holder and bulb and electrically connecting the holder to the said other handle.

12. A battery charger clamp as defined above in claim 11, in which:
(i) the end of said other handle engaging and compressing the spring when the sleeve is slipped over the handle to maintain the electrical connection, the spring allowing a relative movement of the handle end and bulb holder within a limited range and yet maintaining the electrical connection.

13. A battery charger clamp as defined above in claim 12, in which:
(j) the sleeve is of a translucent material about the bulb which masks any light from the bulb caused by a voltage between a battery terminal and test contact that is less than a predetermined value.

14. A battery charger clamp as defined above in claim 13, in which:
(k) the sleeve provides insulation about the end of the handle and about the test contact so that in the event of incorrect connection no metal of the handle will accidentally engage the battery terminal to cause high current flow.

15. In a battery charger clamp:
(a) a pair of handles hingedly connected to provide jaws at one end,
(b) spring means tending to urge the jaws together, the jaws including terminal contacts,
(c) a cable attached to one of the handles and electrically connected to the terminal contact of its jaw,
(d) a polarity detector carried by the other handle including a bulb,
(e) a test contact and
(f) means electrically connecting the bulb and test contact, and,
(g) a tap wire electrically connecting the bulb to the cable.

16. A battery charger clamp as defined above in claim 15, in which:
(h) the test contact is fixed at and extends beyond the end of the handle, the test contact being adapted to engage a battery erminal.

17. A battery charger clamp as defined above in claim 16, in which:
(i) the handles and jaws are covered with an insulating material so that the terminal contacts are insulated from the jaws and so that the test contact is insulated from the handle end.

18. A battery charger clamp as defined above in claim 15, in which:
(h) means is associated with the bulb precluding light to indicate an incorrect connection when the voltage between the battery terminal and test contact is less than a predetermined value.

19. A battery charger clamp as defined above in claim 18, in which:
(i) the last said means consists of a translucent material about the bulb which masks any light from the bulb caused by a voltage between the battery terminal and test contact that is less than a predetermined value.

20. In a battery charger clamp:
(a) a pair of handles hingedly connected to provide jaws at one end,
(b) spring means tending to urge the jaws together,
(c) terminal contacts attached to the jaws,
(d) a cable attached to one of the handles and electrically connected to the terminal contact of its jaw,
(e) a polarity detector carried by the other handle including a bulb,
(f) a test contact fixed at and extending beyond the end of the said other handle, the test contact being adapted to engage a battery terminal, and
(g) a tap wire electrically connecting the bulb to the cable,
(h) the handles and jaws being covered with an insulating material so that the terminal contacts are insulated from the jaws and so that the test contact is insulated from the handle end, and
(i) a translucent cap fitted over the bulb which masks any light from the bulb caused by a voltage between the battery terminal and test contact that is less than a predetermined value.

No references cited.

NEIL C. READ, *Primary Examiner.*

D. K. MYER, *Assistant Examiner.*